United States Patent [19]

Nakai

[11] 4,297,012
[45] Oct. 27, 1981

[54] EXPOSURE CONTROL ARRANGEMENT FOR PHOTOGRAPHIC CAMERAS

[75] Inventor: Masaaki Nakai, Nara, Japan

[73] Assignee: Minolta Camera Kabushiki Kaisha, Osaka, Japan

[21] Appl. No.: 101,252

[22] Filed: Dec. 7, 1979

[30] Foreign Application Priority Data

Dec. 13, 1978 [JP] Japan ............................... 53-154841
Dec. 25, 1978 [JP] Japan ............................... 53-163800

[51] Int. Cl.³ ............................................. G03B 7/097
[52] U.S. Cl. ................................. 354/23 D; 354/43; 354/50
[58] Field of Search ........................ 354/23 D, 43, 50

[56] References Cited

U.S. PATENT DOCUMENTS 3,842,587 10/1974 Strauss et al. ........................ 354/30
3,903,528 9/1975 Kee ...................................... 354/29
4,103,307 7/1978 Shinoda et al. ................... 354/23 D
4,106,033 8/1978 Nakamoto et al. ............... 354/23 D
4,137,541 1/1979 Mashimo et al. .................. 354/23 D
4,167,312 9/1979 Shinoda et al. ................... 354/23 D

FOREIGN PATENT DOCUMENTS

51-52773 10/1976 Japan .

Primary Examiner—Michael L. Gellner
Attorney, Agent, or Firm—Wenderoth, Lind & Ponack

[57] ABSTRACT

An exposure control arrangement for use in photographic cameras employing digital circuitry and a microprocessor for practical and rational expsoure control of the photographic camera through simple construction at high reliability. The arrangement utilizes a single A-D converter to digitize various analog signals corresponding to the measured light value, set exposure time, set film sensitivity, etc. A single timer circuit to generate substantially all of the time references is used by the arrangement. The microprocessor, connected to the timer circuit and A-D converter controls the operation of the arrangement. The commonality of usage of the A-D converter, timer circuit, and microprocessor decreases the arrangement's size, cost, and complexity while increasing the arrangement's overall reliability.

8 Claims, 6 Drawing Figures

EXPOSURE CONTROL ARRANGEMENT FOR PHOTOGRAPHIC CAMERAS

BACKGROUND OF THE INVENTION

The present invention generally relates to a photographic camera and more particularly, to an automatic exposure control circuit arrangement for use in a photographic camera.

Following the recent trend to automation in various appliances, there have been proposed a variety of automatic control arrangements in the field of photographic cameras through utilization of digital information, microprocessors, etc. especially for automatic control of exposure for the photographic cameras. However, so far as practical applications are concerned, the conventional automatic control arrangements as described above still have many drawbacks and inconveniences which should be solved on the basis of the correction of the fundamental problems related to the circuit construction.

SUMMARY OF THE INVENTION

Accordingly, an essential object of the present invention is to provide an exposure control circuit arrangement for use in a photographic camera by which practical and rational exposure control of the photographic camera is achieved through employment of digital circuitry.

Another important object of the present invention is to provide an exposure control circuit arrangement of the above described type in which a microprocessor is rationally utilized for the exposure control of the photographic camera.

A further object of the present invention is to provide an exposure control circuit arrangement of the above described type which is simple in construction and stable in functioning with high reliability, and can be readily incorporated into various photographic cameras at low cost.

In accomplishing these and other objects, according to one preferred embodiment of the present invention, there is provided an exposure control arrangement for use in photographic cameras employing digital circuitry and a microprocessor for practical and rational exposure control of the photographic camera through simple construction at high reliability.

By the arrangement according to the present invention as described above, an improved exposure control device for photographic cameras has been advantageously presented so as to effect practical and rational exposure control through employment of digital circuitry associated with a microprocessor, with substantial elimination of disadvantages inherent in the conventional arrangements of the kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Referring to the drawings, the present invention will be described in detail hereinbelow.

In photographic cameras, various time periods related to the exposure control include not only the exposure time, but time periods for compensating various mechanical delays in the functioning of shutter mechanisms, etc.

There has conventionally been proposed a circuit arrangement in which the controls of the various time periods as described above are arranged to be effected through employment of a single timer circuit. In the known circuit arrangement as described above, however, since the timer circuit is adapted to be controlled through a random logic circuit, it is necessary to have data which corresponds to the various time periods which have been previously stored by the timer circuit, and thus, not only is the timer circuit complicated, but the timer circuit can not be commonly used with other circuits necessary for the exposure control, since the control circuit of the timer circuit is constituted by the random logic circuit, thus resulting in an increased number of elements as a control circuit for the camera on the whole.

According to the present invention, a microprocessor is employed for the control of the time circuit, with other control circuits which are related to the exposure functions being arranged to be controlled by the microprocessor so that the microprocessor may be commonly utilized for as many other circuits as possible together with the timer circuit. More specifically, in the present invention, the exposure control arrangement generally comprises a microprocessor, and a timer circuit further including a circuit for producing clock pulses of various periods and a counter circuit with its control circuit; respective data blocks are each arranged to correspond to various time controls, with one of said data blocks being output from the microprocessor to the control circuit in the timer circuit according to the various stages of the exposure functions so that, by selecting a pulse of a predetermined period and the present count value at a counter based on the above-noted input data block in the control circuit used for counting said pulse, the desired time control signals are emitted.

Figure 1:
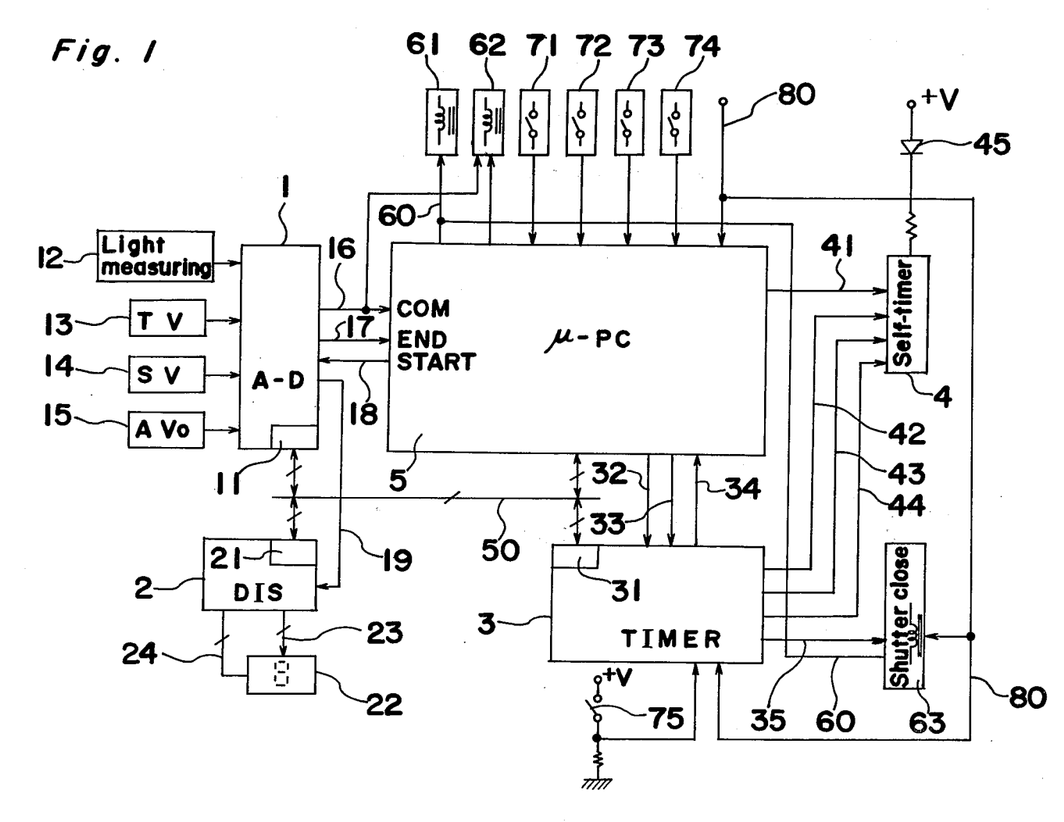
FIG. 1 is an electrical block diagram showing the construction of an exposure control circuit arrangement according to one preferred embodiment of the present invention.
Figure 2:
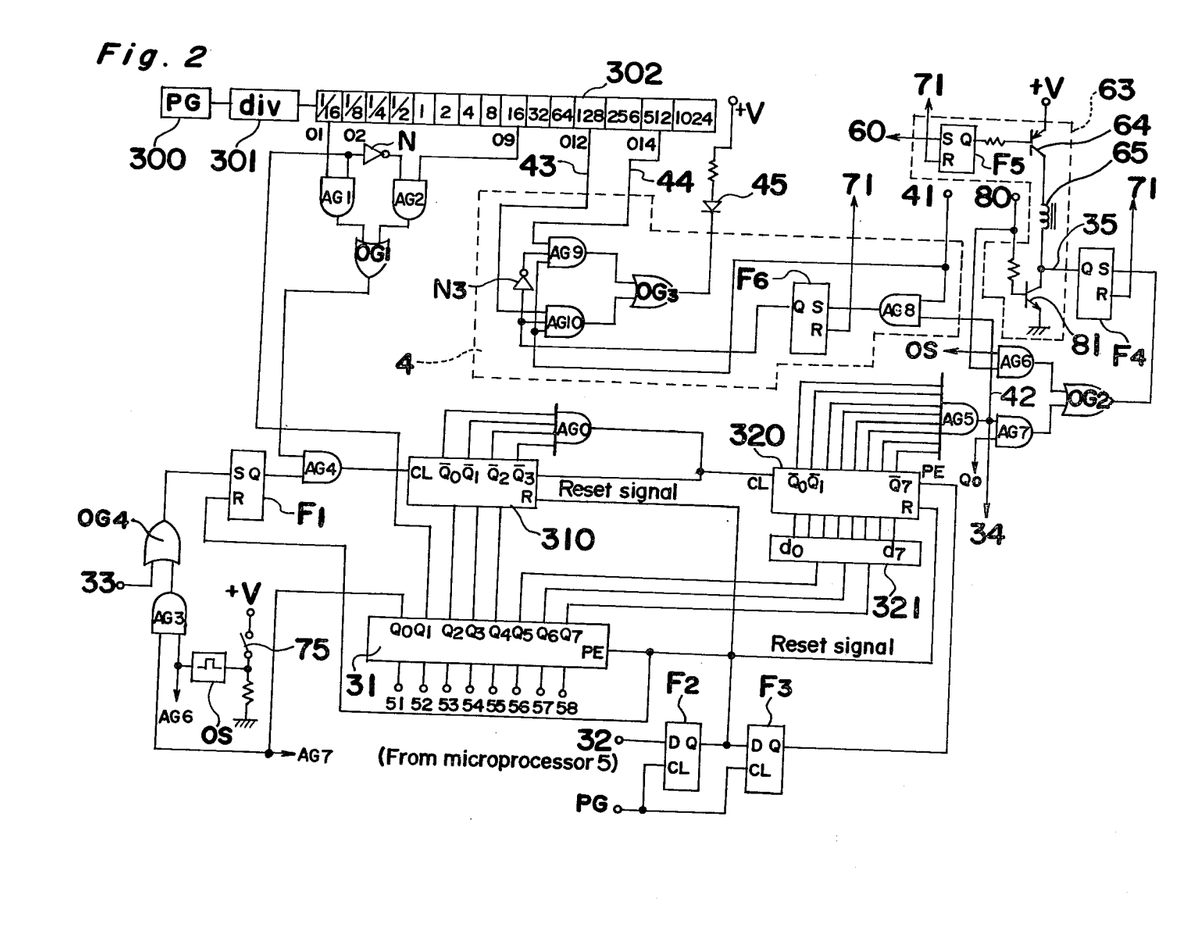
FIG. 2 is an electrical circuit diagram showing the construction of a timer circuit employed in the arrangement of FIG. 1.

Referring first to FIGS. 1 and 2, one preferred embodiment of the present invention will be briefly described hereinbelow. In the timer circuit, the clock pulses to be counted by the counter are classified into two kinds, i.e. one with a period of 1/16 m sec. and the other with a period of 16 m sec., and can be obtained by a frequency divider circuit 302 in FIG. 2. The data to be fed from a microprocessor 5 (represented by μ-PC in FIG. 1) to a timer circuit 3 is applied to a register 31 for storage. The above described data is composed of signals of 8 bits, and the output of a first bit Q0 designates whether it is the time count for exposure control or other time counts. When the Q0 output is "1", it is for the exposure time control, in which case, an AND gate AG3 is opened, and an AND gate AG4 is caused to open by the signal emitted from a switch 75 which is turned ON upon opening of a shutter (not shown) for applying either one of the two kinds of clock pulses described earlier to a programmable counter 310. In cases other than the exposure time counting, the Q0 output is "0", with the AND gate AG3 closed, and the AND gate AG4 is opened by the signal fed from the microprocessor 5 through a signal line 33 for starting the time counting. In the data applied as input to the register 31, the output of a second bit Q1 is a signal for selecting the length of the clock pulses; when the Q1 output is "1", a clock pulse of 1/16 m sec. is applied to the counter 310, since the AND gate AG1 is opened, while on the other hand, when the Q1 output is "0", a clock pulse of 16 m sec. is applied as input to the counter 310. Of the data applied as input to the register 31, the outputs of third to eighth bits Q2 to Q7 are those for designating the number of pulses to be counted by the counter, and are arranged to preset the numbers to be counted in the programmable counters 310 and 320. Although the signal for counting completion of the counter is given by the output of an AND gate AG5, since the Q0 output of the register 31 in cases other than the exposure time counting is "0", an AND gate AG7 is kept closed, and the counting completion signal is fed to the microprocessor 5 through a signal line 34. During the exposure time counting, since the Q0 output of the register 31 is "1", the AND gate AG7 is kept open, and the counting completion signal is fed to the microprocessor 5 through the signal line 34, and also to a shutter closing function control circuit 63 surrounded by dotted lines in FIG. 2 through the AND gate AG7 and an OR gate OG2 for starting the closing function of the shutter.

Subsequent to the brief description of the present invention as described above, the embodiment of the invention will be explained in detail hereinbelow with particular reference to a block diagram of FIG. 1.

In FIG. 1, a light measuring circuit 12 which emits electrical signals corresponding to the brightness of an object (not shown) to be photographed, an output circuit 13 which emits voltage corresponding to the set exposure time, another output circuit 14 which produces voltage corresponding to the set film sensitivity, and a still another output circuit 15 which develops electrical signal corresponding to the open aperture value of the lens which is employed are respectively coupled to an A-D conversion and storage unit 1 which subjects the analog signals from the circuits 12 to 15 to an A-D conversion and stores the respective digital signals in corresponding registers, and which employs an A-D conversion system of the successive approximation type. Further included in the A-D conversion and storage unit 1 is an A-D conversion and control register 11 which is connected to a data bus 50 of eight bits and which stores the data from the microprocessor 5, and according to said data, selects data to be subjected to the A-D conversion and the corresponding storage register in the unit 1. The A-D conversion and storage unit 1 is connected to the microprocessor 5 through a line 16 for developing output signal of a comparator in the unit 1, a line 17 for outputting A-D conversion completion signal, and a line 18 for emitting A-D conversion starting signal, and also connected to a block 2 for display through another line 19 for emitting a signal showing that the light measuring output is being subjected to the A-D conversion. The block 2, including a register 21 for controlling the display block, is coupled to a segment display device 22 through a segment signal line 23 and a digit signal line 24. The microprocessor 5 is further coupled to a timer circuit 3 through a data set signal line 32, the time count starting signal line 33 and time count completion signal line 34, and also to a self-timer circuit 4 through a self-timer completion signal line 41. Meanwhile, the timer circuit 3, including a control register 31 is connected to the shutter closing function control circuit 63 through a shutter closing function starting signal line 35 and also to the switch 75 which is closed upon the starting of the shutter closing function, and further to the self-timer circuit 4 through an intermediate second time counting completion signal line 42, and lines 43 and 44 for on/off signals of an LED 45. The shutter closing function control circuit 63 is connected to a shutter release circuit 61 which is connected to the microprocessor 5 through a shutter release signal line 60, and also coupled to the timer 3 and an input line 80, connected to the microprocessor 5, for an external flash firing preparation completion signal. Further coupled to the microprocessor 5 are a diaphragm aperture control circuit 62 which is also connected to the output line 16, a circuit 71 for a light measuring display starting signal, a circuit 72 for a shutter release starting signal which are respectively arranged to emit signals through opening and closing of switches associated with a shutter release button (not shown). Another circuit 73 for outputting a signal from a switch which is closed upon cocking of the shutter and opened upon completion of the shutter closing function, and a circuit 74 for emitting signals from a switch which is closed during photographing by the self-timer are also connected to the microprocessor 5. Although not particularly shown, the conventional microprocessor 5 includes therein the input and output ports, internal data bus, program memory, program counter, instruction register, instruction decoder, logic operation unit, accumulator, data memory, timing control, etc. in a known manner, and the lines for signal feeding and reception between the microprocessor 5 and various related circuits are connected to the input and output ports, internal bus, timing control and the like of the microprocessor 5.

Hereinbelow, functionings of the arrangement of FIG. 1 will be described with reference to the exposure control operations of the camera. It is to be noted that the description here is related only to the exposure tme priority automatic diaphragm aperture control photographing.

In the first place, upon depression of the shutter release button to its first stage by a photographer, all circuits are reset for starting functionings. Subsequently, data is first set in the A-D conversion control register 11 through the microprocessor 5, and by the signal from the line 18, the value $Bv - Avo$ (where $Bv$ is the APEX value of the scene brightness, and $Avo$ is the APEX value of the open diaphragm aperture) from the light measuring circuit 12 is subjected to an A-D conversion to be stored in a predetermined register. Upon receipt of the A-D conversion completion signal from the line 17 by the microprocessor 5, the microprocessor 5 sets in the register 11 the data from the block 13, and by the signal from the line 18, subjects the value Tv (the APEX value of the set exposure time) to an A-D conversion for storage in a predetermined register, with the completion signal being emitted from the line 17. Subsequently, in the similar manner as above, values Sv (the APEX value of the sensitivity of the film employed) and Avo are subjected to an A-D conversion so as to be stored in a predetermined register in the block 1.

In the next step, the microprocessor 5 judges whether the firing preparation completion signal is applied as input to the line 80 from a flash source, for example, an electronic flash. Then, in the case other than for flash photography, the microprocessor 5 carries out operations to solve an equation $(Bv - Avo) + Avo + Sv - Tv = Av$ on the basis of the photographic data stored in the register within the A-D conversion unit 1, while, in the case of photography using a flash source such as a electronic flash, Av and Tv values suitable for such photography are calculated. Subsequently, the Av value thus calculated and set Tv value or Av and Tv values for the electronic flash photography and data indicating the use of flash are set in a register within the display circuit 2, and according to the signal from the control register 21, the diaphragm aperture value or f number and exposure time are dynamically displayed by the display device 22.

Thereafter, the microprocessor 5 judges whether the shutter release signal is applied from the shutter release starting signal circuit 72 or not, and if not, the functions of A-D conversion, operations and display are effected again. When the shutter release signal is being applied, presence of the signal from the circuit 73 for outputting the signal from the switch, which is closed upon shutter charging and opened upon closing of the shutter, is detected, and if said signal is not being applied as input, it means that the photographing preparation is not ready, and the microprocessor 5 again goes back to the A-D conversion function. Therefore, when the shutter release button has been depressed down to the first stage, with the shutter charged, and also when the shutter release button has been depressed to the first or second stage, with the shutter not cocked, the functions for the A-D conversion, operations and display are repeated, while the above functions are stopped when the shutter release button is released. It is to be noted that during the A-D conversion of the signal from the light measuring circuit 12, the display is extinguished by the signal from the line 19, but the display appears to be continuous, since the A-D conversion and operation display are repeated at a high speed.

When the shutter release signal is being applied as an input and if the shutter is cocked, then the display extinguishing signal is subsequently transferred to the display control register 21, and the display goes out. Then, the microprocessor 5 judges whether or not the self-timer photography signal is being emitted from the block 74. In the self-timer photography mode, the set signal for data corresponding to eight seconds is applied as input from the microprocessor 5 to the timer circuit control register 31 through the line 32, and thus, the data for eight seconds is set in the timer circuit 3. Thereafter, counting is started by the start signal from the line 33, while a "high" signal is emitted from the line 41. During the time count of eight seconds, the display LED 45 flickers by the pulse of 0.5 seconds period from the line 44 for indicating that the timer function is in progress. Upon termination of the counting for eight seconds, the count completion signal is developed in the line 34, while two second data is transferred from the microprocessor 5 to the timer control register 31 so as to be set in the timer circuit by the set signal through the line 32 and to start counting by the start signal through the line 33. Meanwhile, upon termination of the eight second counting, the completion signal is emitted from the line 42, and the LED 45 flickers by the pulse of $\frac{1}{8}$ second period to inform that the shutter is to be released soon. When the counting for two seconds is terminated, the completion signal is applied to the microprocessor 5 through the line 34 to render the line 41 to be "low", and the LED 45 is put out. Subsequently, the microprocessor 5 again carries out the A-D conversion, judges whether or not the flash source is to be used, carries out the calculation, and applied the shutter release signal to the shutter release circuit 61. On the other hand, in the case other than the self-timer photography, the shutter release is effected immediately after discrimination of the self-timer signal from the block 74.

When the shutter release is effected by the shutter release circuit 61, eight m sec. data is set in the timer circuit 3 for starting the counting so as to hold the time for eight m sec. until the starting of movement of the diaphragm aperture member, and upon termination of the counting, data obtained by adding a constant $\alpha$ to the set $Tv - Sv$ is set in a D-A converter in the A-D conversion unit. In the diaphragm aperture control in the foregoing embodiment, since there is a relation represented by $Bv + Sv - Av = Tv$ in the values Tv, Sv, and value Av to be determined by the scene brightness Bv, it is so arranged that, by comparing the values $Tv - Sv$ and $Bv - Av$ during stopping down of the diaphragm aperture, the stopping down is suspended by the signal from the magnet circuit 62 when the both values have become equal to each other. In the above case, in order to prevent the diaphragm aperture from being undesirably stopped down excessively due to delays in the functioning of the disphragm aperture mechanical portions, and of the magnet in the diaphragm aperture control circuit 62, the value obtained by adding the constant $\alpha$ to the value $Tv - Sv$ is arranged to be set in the D-A converter so that the coincidence signal is emitted at the open side with respect to the planned diaphragm aperture value or f number. Furthermore, the comparator output becomes possible according to the data of the A-D control register 11. On the other hand, for photography using a flash source, data corresponding to a voltage smaller than a limit value of the output voltage from the light measuring circuit 12 is set in the D-A converter so as to achieve positive stopping down to the preset diaphragm aperture position. The data as described above is calculated by the microprocessor 5 in a known manner.

Subsequently, a time period of 32 m sec., required for the diaphragm aperture to be stopped down to the minimum aperture, is set in the timer circuit 3 and the counting is started. The comparator signal provided by the register 11 is emitted through the line 16, upon coincidence of the outputs from the D-A converter and light measuring circuit 12 so as to be applied as input to the diaphragm aperture control circuit 62 and to the microprocessor 5, which starts next functioning simultaneously with the interruption of the stopping down operation. Meanwhile, upon sudden changes of the scene brightness or in the case of flash photography, the comparator signal through the line 16 is not emitted even when the diaphragm aperture reaches the minimum value or preset value, the count completion signal from the timer circuit 3 is applied to the microprocessor 5 through the line 34, and then, the diaphragm aperture control circuit 62 is caused to function by the signal from the microprocessor 5.

In the next step, eight m sec. data for the time period from the suspension of the stopping down to stabilization of the diaphragm aperture is set in the counter circuit for counting. Upon termination of the counting, the A-D conversion of the signal from the light measuring circuit 12 is again effected. In the above case, the light measuring output is represented by Bv−Av, and the value Tv is worked out by addition of the value Sv to these data. With the value Tv set in the timer circuit 3, mechanical operations such as mirror lock-up, etc. are effected to wait for the starting of the shutter opening function.

Upon starting of the shutter opening function, the switch 75 is closed for initiating the counting of time obtained by logarithmic expansion of the value Tv, and when the counting is terminated, the count completion signal is produced in the line 35 so as to start the closing function by the shutter closing function control circuit 63. Meanwhile, for flash photography, the closing function starting signal is immediately developed in the line 35 in response to the closing of the switch 75, but the shutter closing function control circuit 63 does not function without starting of the closing function, since the firing preparation completion signal from the electronic flash is applied to the line 80. Upon full opening of the shutter, the firing starting signal is emitted to the electronic flash from the camera side, with disappearance of the firing preparation completion signal to the line 80, and the closing function is started by the shutter closing function control circuit 63. After setting the exposure time, the microprocessor 5 is brought, in its function, into a state waiting for the signal from the block 73.

When the closing function has been completed, the completion signal is applied to the microprocessor 5 from the block 73, and data for the time period 32 m sec. required for the mechanical parts (mirror, diaphragm, etc.) to return to the original state is set in the timer circuit 3 for starting the counting. Upon termination of the counting, the A-D conversion, calculation and display are repeated from the start.

Referring back to FIG. 2 showing specific examples of the timer circuit 3, self-timer circuit 4 and shutter closing function control circuit 63, the portion 4 surrounded by dotted lines and including a inverter N3, AND gates AG9, AG10, an OR gate OG3, a flip-flop F6 and an AND gate AG8 connected as shown in the self-timer circuit, and the portion 63 also surrounded by dotted lines and including a flip-flop F5, transistors 64 and 81, and a magnet 65 coupled as shown represents the shutter closing function control circuit, while the other portion is equivalent to the timer circuit.

In FIG. 2, a clock pulse generator 300 which generates standard clock pulses is coupled to frequency dividers 301 and 302, in which clock pulses of 1/16 m sec. period are emitted from 01, those of ⅛ m sec. period from 02, those of 16 m sec. period from 09, those of 128 m sec. period from 012, and those of 512 m sec. period from 014. The control register 31 has its terminals 51, 52, 53, 54, 55, 56, 57 and 58 connected to the data bus 50 (FIG. 1). The programmable counter 310 for the prescaler is arranged to count input clock pulses corresponding in number to signals from terminals Q2, Q3 and Q4 of the control register 31. When the number of counts of the input clock pulses is represented by N, the relationship as shown in Table 1 below is noted.

TABLE 1

| N | Q2 | Q3 | Q4 | N | Q2 | Q3 | Q4 |
|---|----|----|----|----|----|----|----|
| 9 | 0 | 0 | 0 | 13 | 0 | 0 | 1 |
| 10 | 1 | 0 | 0 | 14 | 1 | 0 | 1 |
| 11 | 0 | 1 | 0 | 15 | 0 | 1 | 1 |
| 12 | 1 | 1 | 0 | 16 | 1 | 1 | 1 |

The decoder 321 generates, at its terminals d0, d1, d2, d3, d4, d5, d6 and d7, signals as shown in Table 2 below corresponding to the signals from the terminals Q5, Q6 and Q7 of the control register 31.

TABLE 2

| Q5 | Q6 | Q7 | d7 | d6 | d5 | d4 | d3 | d2 | d1 | d0 |
|----|----|----|----|----|----|----|----|----|----|----|
| 0 | 0 | 0 | 0 | 0 | 0 | 0 | 0 | 0 | 0 | 1 |
| 0 | 0 | 1 | 0 | 0 | 0 | 0 | 0 | 0 | 1 | 0 |
| 0 | 1 | 0 | 0 | 0 | 0 | 0 | 0 | 1 | 0 | 0 |
| 0 | 1 | 1 | 0 | 0 | 0 | 0 | 1 | 0 | 0 | 0 |
| 1 | 0 | 0 | 0 | 0 | 0 | 1 | 0 | 0 | 0 | 0 |
| 1 | 0 | 1 | 0 | 0 | 1 | 0 | 0 | 0 | 0 | 0 |
| 1 | 1 | 0 | 0 | 1 | 0 | 0 | 0 | 0 | 0 | 0 |
| 1 | 1 | 1 | 1 | 0 | 0 | 0 | 0 | 0 | 0 | 0 |

The presettable counter 320 is coupled to the decoder 321 so as to be set by the signals from said decoder 321. A block constituted by the AND gates AG1 and AG2, OR gate OG1 and inverter N is connected between the frequency divider 302 and control register 31 so as to emit clock pulses of a 16 m sec. period when the Q1 output of the control register is "1", and to emit clock pulses of 16 m sec. period when the Q1 output is "0"; another block constituted by the AND gates AG3 and AG4, switch 75, one-shot circuit OS and flip-flop F1 emits the exposure time count starting signal when the Q0 output of the control register 31 is "1", and generates the count starting signal from the microprocessor 5 when said Q0 output is "0". Flip-flops F2 and F3 constitute a block which emits signals for resetting and presetting the control register 31, programmable counter 310, and presettable counter 320. Meanwhile, another block constituted by the AND gates AG5, AG6 and AG7, OR gate OG2 and a flip-flop F4 is connected between the shutter closing function control circuit 63 and presettable counter 320 for emitting the count completion signal to the shutter closing function control circuit 63 when the Q0 output of the control register 31 is "1", and to the microprocessor 5 and self-timer circuit when the Q0 output is "0".

Subsequently, the functioning of the circuit arrangement of FIG. 2 will be described hereinbelow.

In the first place, the principle of time counting will be explained. For counting the exposure time in ⅛ EV unit, the exposure time is represented by $$t = \frac{k}{f} \times 2^{10-\gamma} \times 2^{1-\frac{\beta}{8}} \tag{1}$$

where f is the frequency of the clock pulse, k is a constant, γ is the whole number portion of the value Tv and β/8 denotes the decimal portion of the value Tv, β being the whole number of from 0 to 7. When the above equation (1) is approximated by $$t = \frac{k}{f} \times 2^{10-\gamma} \times \frac{16-\beta}{8} \qquad (2)$$

with the constant k set to be equal to 8 so that clock pulse of $1/f=1/16$ m sec. is selected up to $\gamma=3\sim 10$, and that of $1/f=16$ m sec. is selected at $\gamma=2\sim -5$, with the portion $2^{10-\gamma}$ set to be $2^{2-\gamma}$, counting of the exposure time in the range of the value $Tv=10\frac{7}{8}\sim Tv=-5$ becomes possible according to Tables 1 and 2, and since the maximum error by the approximation is 6.1%, the exposure time can be controlled to a high accuracy. In the above case, the exposure time counting is effected by forming the clock pulse with period of $(16-\beta)/f$ m sec. at the programmable counter 310 and by counting the clock pulses of $2^{10-\gamma}$ or $2^{2-\gamma}$ in number, fed from the programmable counter 310 at the presettable counter 320, the exposure time counting is effected. Similarly, in various other time countings, the time counting is effected in the same manner as in the exposure time according to an equation.

$$t = \frac{k}{f} \times 2^n \times \frac{16-0}{8} = \frac{16}{f} \times 2^n \qquad (3)$$

Subsequently, the functionings of the circuit of FIG. 2 will be described in detail according to the functionings explained earlier with reference to FIG. 1. When the circuit is set for the self-timer function by the block 74, the set signal is applied from the microprocessor 5 to the timer circuit 3 through the line 32, and at the leading edge of the initial clock pulse, the Q output of the flip-flop F2 becomes "high" to make the control register 31 presettable, and thus, the signal "00111101" from the data bus is set, and the output at the output terminals Q0 to Q7 is similarly set at "00111101". Simultaneously, the flip-flop F1, programmable counter 310 and presettable counter 320 are reset, and thus, the output of an AND gate AG0 becomes "high" to make the presetting enabled, with the data of "111" of the output terminals Q2, Q3 and Q4 are preset. Then, at the leading edge of the subsequent clock pulse, the Q output of the flip-flop F3 becomes "high", and the signal "00100000" of the decoder 321 is preset in the presettable counter 320 (it is to be noted that according to the rules in Table 2 earlier described, the output of the decoder 321 corresponding to the lower three figures 101 of the output of the control register 31 is 00100000). Thereafter, since the output in the line 41 to be fed from the microprocessor 5 to the self-timer circuit 4 becomes "high" and the AND gate AG9 is opened by the Q output of the flip-flop F6 to be reset by the signal from the block 71, the clock signal with a 512 m sec. period from the line 44 is emitted as an output from the OR circuit OG3. Subsequently, upon application of the start signal from the microprocessor 5 from the line 33, the flip-flop F1 is set and the AND gate AG4 is opened. Meanwhile, since the terminal Q1 of the control register 31 is a logic "0", the AND gate AG2 is in the open state, and a clock pulse with a 16 m sec. period is applied from the AND gate AG4 to the programmable counter 310. On the other hand, since the outputs from the terminals Q2, Q3 and Q4 of the control register 31 are "111", on the assumption that the leading edge of the earlier mentioned clock pulse of 16 m sec. is of 16 counts according to the rules of Table 1, the outputs from the terminals $\overline{Q0}, \overline{Q1}, \overline{Q2}$ and $\overline{Q3}$ are all a logic "1", and the output of the AND gate AG0 becomes "high". Upon the leading edge of this signal, the programmable counter 310 is again preset, and simultaneously, 1 is subtracted from the presettable counter 320. During repetition of the above functions, the LED 45 is turned ON and OFF at a period of 512 m sec. Since the preset value of the presettable counter 320 is "00100000", a "high" level is enerated by the AND gate AG5 upon the elapse of the time period equivalent to 16 (m sec.)$\times$16(counts)$\times 2^5$(times)$=8192$ m sec., and the flip-flop F6 is set through the line 42, with the AND gate AG9 closed and an AND gate AG10 opened, and thus, clock pulses of a 128 m sec. period are generated by the OR gate OG3. Meanwhile, to the microprocessor 5, the count completion signal is applied through the line 34, and from the microprocessor 5, the data block "00111011" is set in the control register 31 through the data bus 50. Subsequently, in a similar procedure to that described in the foregoing, 1 is subtracted from $2^3$ during each 16 countings of the clock pulse of 16 m sec., and after the time period of 2048 m sec. at which time the content of the presettable counter 320 becomes "0", the count completion signal is applied to the microprocessor 5, and thus, the line 41 becomes "low" due to the microprocessor 5, while the LED 45 stops flickering and is extinguished. On the other hand, when the second count completion signal to the line 34 is fed to the microprocessor 5, a signal is applied from the microprocessor 5 to the shutter release circuit 61 for releasing the shutter.

Upon releasing of the shutter, in order to obtain the delay time of 8 m sec. up to the starting of movement of the diaphragm aperture member, the data block "01111011" is set in the control register 31, and the delay time is achieved by counting $16\times 2^3$ counts of clock pulses of a 1/16 m sec. period in a similar manner to that stated earlier.

Upon entry into the diaphragm aperture control function, the data corresponding to the value $Tv-Sv+\alpha$ is set in the D-A converter of the A-D converting 1 as described with reference to FIG. 1, while the data block "01111101" is set in the control register 31 for starting the counting, and thus, the inversion of the comparator output in the line 16 and the count completion signal of the timer circuit are alternately discriminated.

When the D-A conversion output coincides with the output of the light measuring circuit 12, the comparator output at the line 16 is inverted, and by the inversion signal, the diaphragm aperture stopping down function is suspended through the aperture control circuit 62, while the microprocessor 5 proceeds to the subsequent function upon receipt of said inversion signal from the line 16. Moreover, when the comparator output through the line 16 is not inverted even at the time point where the time period of $1/16\times 16\times 2^5 = 32$ m sec., corresponding to the data set in the control register 31, has elapsed, then the diaphragm aperture is stopped down to the minimum aperture, and the diaphragm aperture control circuit 62 is caused to function by the signal from the microprocessor 5; then, the microprocessor 5 is advanced into the subsequent function.

After ceasing of the diaphragm aperture stopping down, the delay time period 8 m sec. up to the stabilization of the diaphragm aperture is counted in a similar manner to that stated earlier, and by calculating the exposure time Tv through re-light measuring, the data is set in the timer circuit 3 so as to wait for the shutter closing function to start.

During counting of the exposure time, which is different from the other time countings, the Q0 output of the control register 31 becomes a "1", and when the whole number portion of the value Tv is from 10 to 3, the Q1 output is a "1"; the Q1 output is a "0", if the whole number portion of the value Tv is from 2 to −5. As shown in Table 1, the Q2, Q3 and Q4 outputs are "000" at the Tv decimal portion of $\frac{7}{8}$, are "001" at that of 6/8, and in a similar manner, are "111" at that of 0/8. Meanwhile, as tabulated in Table 2, the Q5, Q6 and Q7 outputs are "000" at the Tv whole number portion of 10, a "001" at that of 9, and in a similar manner, are "111" at that of 3; they return to "000" when the Tv whole number portion becomes 2, and become "111" at said Tv whole number portion of −5.

Since the flip-flops F4 and F5 are reset by the signal from the light measuring starting signal circuit 71 and the flip-flop F5 is set by the release signal through the line 60, a shutter closing function control magnet 65 stops the shutter closing function. When the shutter opening function is started through a mechanical function, the switch 75 is closed to produce pulses from the one shot circuit OS, and by the pulse outputs from the AND gate AG3 and OR gate OG4, the flip-flop F1 is set for starting the counting of the exposure time. Upon termination of the exposure time counting according to the principle of the equation (3) mentioned above, the flip-flop F4 is set by the signal from the AND gate AG5 through the AND gate AG7 and OR gate OG2, and the magnet 65 becomes non-conductive to start the shutter closing function.

On the other hand, during flash photography, when the firing preparation completion signal is received as an input, the signal from the one shot circuit OS sets the flip-flop F4 through the AND gate AG6 and OR gate OG2, but since the transistor 81 is conductive, the magnet 65 remains energized. Therefore, the flip-flop F4 is set, irrespective of the data from the control register 31, upon the starting of the shutter opening function. Subsequently, when the shutter is fully opened, the electronic flash is fired, with disappearance of the firing preparation completion signal, while the transistor 81 becomes non-conductive and magnet 65 is de-energized to start the shutter closing function.

The microprocessor 5, waiting for the shutter closing function completion signal from the circuit 73, carries out the time counting for 32 m sec. upon receipt of said signal from the circuit 73 in a similar manner to that stated earlier, and as described with reference to FIG. 1, the light measuring and display functions are effected while the shutter release button is depressed.

Figure 3:
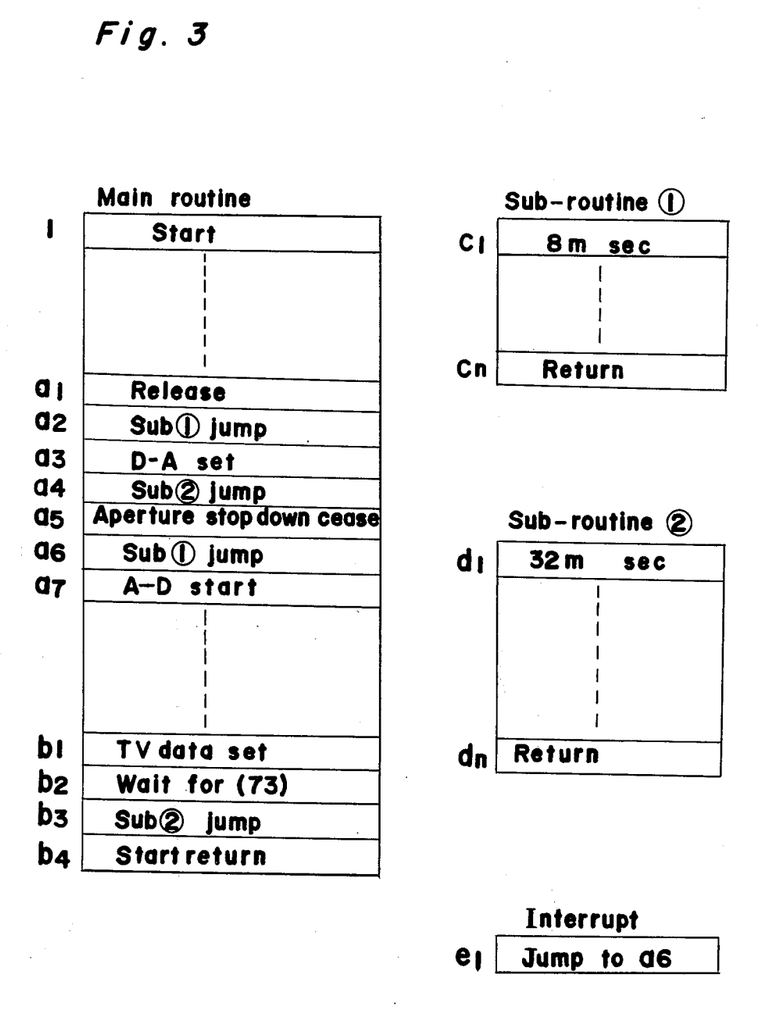
FIG. 3 is a flow chart explanatory of execution of the present invention through instructions by a microprocessor.

Additionally, the time countings for 8 m sec. and 32 m sec. may be effected according to the flow chart of FIG. 3. Since the time required for the microprocessor 5 to execute one instruction is constant, formation of the time for 8 m sec. and 32 m sec. becomes possible, for example, in such a manner that, with certain data set in the data memory portion of the microprocessor 5, the function in which 1 is repeatedly subtracted from the data and in which, when the data become 0, certain data is again set for repetition of the subtraction of 1 therefrom, is repeated a plurality of times.

Referring particularly to the flow chart of FIG. 3, after light measuring and display, etc. subsequent to starting, upon arrival at an address a1, the shutter releasing is effected by the circuit 61, and after jumping at an address a2, over to a leading address c1 of the sub-routine (1) to effect the counting of 8 m sec., with subsequent returning to an address a3 of the main routine by the return instruction of an address $c_n$, the data is set in the A-D control register 11 and also in the D-A converter for making it possible to generate the comparator signal from the line 16, and through jumping at an address a4, over to a leading address d1 of the sub-routine (2), the counting of 32 m sec. is started. During execution of the sub-routine (2), when the comparator signal in the line 16 is inverted, the diaphragm aperture stopping down is suspended directly by the aperture control circuit 62 through the inverted signal, and the microprocessor 5 receives this signal as an interrupt signal for jumping to a particular address e1, and executes the instruction for jumping to an address a6.

Meanwhile, in the case where the comparator signal is not inverted during the execution of the sub-routine (2), a return is made to an address a5 of the main routine by the return instruction of an address $d_n$ to actuate the diaphragm aperture control circuit 62, and upon jumping to the sub-routine (1) at an address a6, after the time period of 8 m sec. for the stabilization of the diaphragm aperture, a return is made to an address a7 to effect light remeasuring and obtain the value Tv through calculation, and at an address b1, the Tv data is set in the timer circuit 3 so as to wait for the shutter closing function completion signal to be fed from the circuit 73 at an address b2. Upon completion of the shutter closing function, the instruction for jumping to the sub-routine (2) at an address b3 is executed and the time period of 32 m sec. is counted until the camera becomes capable of light measuring and for returning to the address b4 by the return instruction of the address dn so as to execute the instruction to return to the start. Moreover, the time counting for the self-timer photography may be effected through a combination of the instructions of the microprocessor 5.

On the other hand, if there are more than two kinds of interrupts to be effected during the time counting, it may be so arranged that, the before starting of the time count, the address data of the leading address in the case of an interrupt is set in a particular register, and upon receipt of the interrupt signal, the contents of the register set with the address data is first applied as input to the program counter.

As is seen from the foregoing description, according to the present invention, by employing the microprocessor and register for the control of the timer circuit, it has become possible to use other circuits (for example, A-D conversion circuit, display circuit) commonly with the control circuit with a consequent reduction of the number of elements to be employed, and thus, not only can the whole exposure control circuit be readily constituted in the form of a one-chip LSI element, but further reduction of cost may be achieved, if a microprocessor for general purpose use is adopted.

Figure 4:
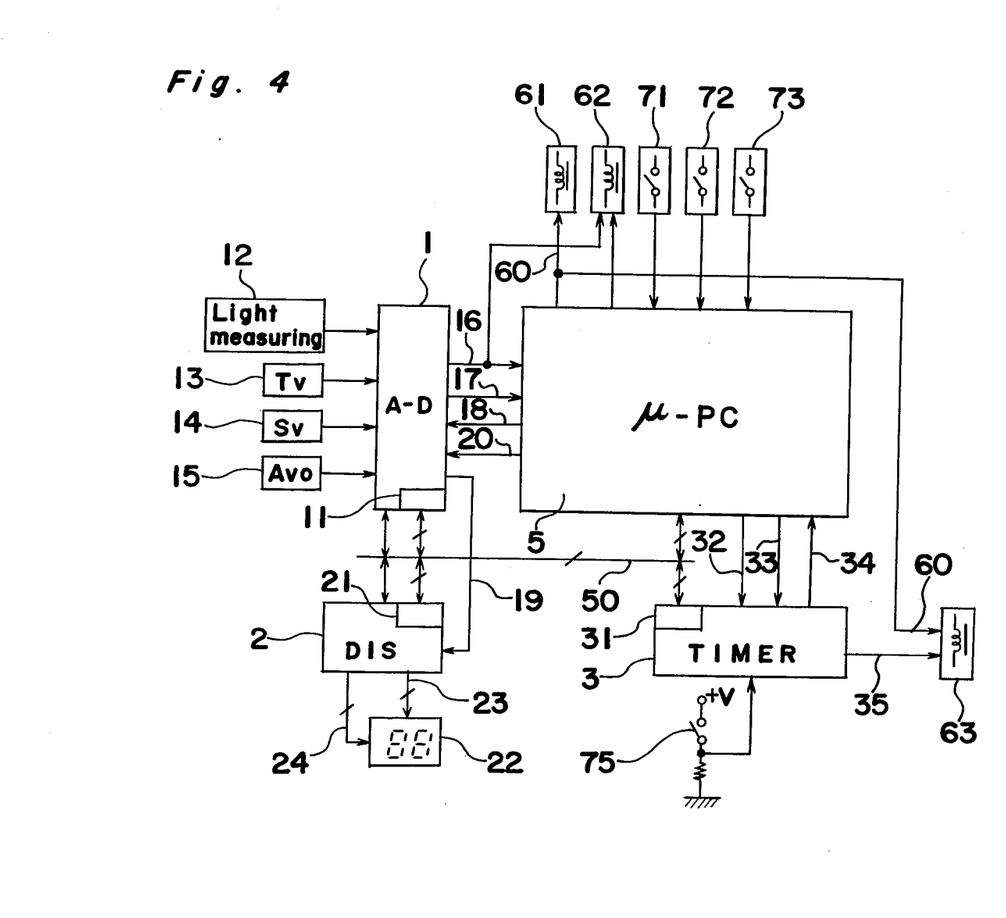
FIG. 4 is an electrical block diagram similar to FIG. 1, which particularly shows a modification thereof.

Referring now to FIG. 4, there is shown a modification of the circuit arrangement of FIG. 1.

In general, the exposure control for cameras includes two aspects, i.e. one aspect related to the exposure factor computation functions such as light measuring, computation of exposure time or diaphragm aperture value, etc., and the other aspect related to mechanism control such as stopping down of the diaphragm aperture from open aperture to a predetermined aperture, opening or closing of the shutter and the like. Regarding the exposure factor computation function, the digital system has come to be employed from the viewpoint of stability and accuracy in functioning.

On the other hand, in the mechanism control aspect for setting the diaphragm aperture, since the measured value of light transmitted through the photographic lens while the diaphragm aperture is being stopped down is dealt with as an uncoverted value, it becomes necessary to again convert the digital data corresponding to the calculated aperture value to an analog value for comparison with said measured value of light transmitted through the photography lens, and thus, the exposure factor computation function includes therein both functions for A-D conversion and D-A conversion.

Conventionally, for the exposure control of cameras as described above, it has been so arranged that one particular control circuit is employed for the exposure factor computation, while a separate control circuit is adopted for the mechanism control. The modified arrangement of FIG. 4 mainly intends to control the above mentioned two aspects of functions by a common microprocessor to increase portions common to both of the control circuits for reducing the number of elements to be employed for the exposure control circuit on the whole.

In the modified arrangement of FIG. 4, like parts in FIG. 1 are designated by like reference numerals for clarity. In FIG. 4, the portion including the light measuring circuit 12 for measuring the light transmitted through the photography lens, exposure time setting circuit 13, film sensitivity setting circuit 14, circuit 15 for emitting a signal equivalent to the open diaphragm aperture value of the lens mounted on the camera (the outputs from the above described circuits are analog signals), A-D conversion unit or block 1 which receives the signals from the above described circuits for A-D conversion or conversion of digital information to analog signal, display control circuit 2, and segment display unit 22 are all related to the exposure factor computation mentioned earlier; the portion including the switch 71 which is closed at the first stage of depression of the shutter release button for initiating the light measuring function, switch 72 which is closed upon further depression of the shutter release button for emitting the shutter release signal, switch 73 which is closed upon cocking of the shutter and opened upon closing of the shutter during the exposure function, shutter releasing circuit 61 for releasing the shutter through an electromagnetic mechanism, diaphragm aperture control circuit which stops the diaphragm aperture from stopping down when the diaphragm aperture has been stopped down from an open aperture to a predetermined aperture, shutter closing control circuit which is controlled by the timer circuit 3 for causing the shutter to be closed, and the timer circuit 3 for time counting the above mentioned exposure time and various delay time periods for adjusting the timing of the functions of the mechanisms in addition to the self-timer time counting, are all related to the mechanism control in the exposure function mentioned earlier.

In the conventional arrangements, the circuit equivalent to the above block 1 which effects A-D and D-A conversion for the exposure factor computation is arranged to control by itself the functions such as A-D conversion of each factor, photographic calculation of exposure factor, storing of digital data, D-A conversion, etc., and in the portion related to mechanism control also, is provided with a control circuit which checks by itself the opening and closing of the switches 71 to 73, termination of the time period set in the timer circuit 3, etc. for emitting control signals to the shutter release circuit 61, diaphragm aperture control circuit 62, shutter closing control circuit 63 and the like.

On the contrary, in the modified arrangement of FIG. 4 according to the present invention, the microprocessor 5 is employed as a control circuit common to both the exposure factor computation and mechanism control, and for the exposure computation portion, the block 1 effects A-D conversion and D-A conversion through control by the microprocessor 5, but does not carry out by itself, control functions related to A-D conversion, display, etc., with calculations being effected by the microprocessor 5, while regarding the mechanism control also, the microprocessor 5 checks the opening and closing of the switches 71 to 73, termination of time period set in the timer circuit 3, etc. for emitting the control signal to the shutter release circuit 61 and the like.

In FIG. 4, the block 1 is provided with a number of registers for effecting the A-D conversion and D-A conversion and storing the digital data, and is also provided with the control register 11. The register 11 is a kind of an instruction register of the microprocessor 5, and is arranged to store the data fed from the microprocessor 5 through the data bus 50 for changing over by the data, the designated functions, for example, the A-D conversion of the output of the light measuring circuit 12, A-D conversion of the film sensitivity information, etc.

In the arrangement of FIG. 4, when the switch 71 is closed at the first stage of depression of the shutter button, the entire arrangement is reset to start the functions for the light measuring, calculation and display. When the data is output from the microprocessor 5 through the data bus 50 and read-in signal is fed from the microprocessor 5 to the block 1 through a line 20, said data is read in the control register 11. Subsequently, the A-D conversion starting instruction signal is fed to the block 1 through the line 18, and the output of the light measuring circuit 1 represented by Bv-Avo is first subjected to an A-D conversion. During the A-D conversion, the signal under the A-D conversion is being fed to the microprocessor 5 from the block 1 through the signal line 16. Upon completion of the A-D conversion, the A-D conversion completion signal is fed from the block 1 to the microprocessor 5 through the line 17, and from the microprocessor 5, subsequent data is fed to the control register 11 through the data bus 50 for reading-in via the line 20, while the APEX value Tv of the set exposure time, which is the output of the exposure time setting circuit 13, is subjected to A-D conversion by the signal through the line 18. Henceforth, the functions similar to the above are repeated, and the film sensitivity value Sv and open aperture value Avo are successively subjected to A-D conversion so as to be stored in the corresponding registers in the block 1. Thereafter, the respective digital data, as described above, is fed through the data bus 50 to the microprocessor 5, whereat the required diaphragm aperture value Av is calculated by $(Bv-Avo)+Avo+Sv-Tv$, and the result and set Tv value are fed to the display control circuit 2 through the data bus 50 so as to be displayed by the display unit 22. The control register 21 in the display control circuit 2 is similar to the control register in the block 1, and carries out segment selection of the display device, and designation of digits by the data from the microprocessor 5 for dynamically displaying the value of Tv through the segment signal line 23 and digit designation signal line 24.

The function as described in the foregoing is repeated at the stage where the switch 71 is closed, and the Av value approximately follows the variation of scene brightness. When the shutter release button is further depressed to close the switch 72, with the shutter being in the cocked state, the function as described earlier is suspended and the value Av is fixed. Although the above value Av may be regarded as the proper diaphragm aperture value for the preliminarily set exposure time, since there are cases where the scene brightness may differ thereafter but before the actual shutter releasing, the diaphragm aperture value is not directly determined by the above Av value, but the value for $Bv - Av$ is obtained from the already obtained values for $Bv - Avo$ and Avo so as to be subjected to D-A conversion and compared with the output of the light measuring circuit 12 by the analog comparator in the block 1 while the diaphragm aperture is being stopped down. Upon detection of the coincidence between the two values, a signal is fed from the microprocessor 5 to the control circuit 62 to suspend the stopping down of the diaphragm aperture. By the functions described so far, the proper diaphragm aperture value is set. The reason for setting the disphragm aperture by the procedures as described above will be explained more in detail later.

Subsequent to the functionings described in the foregoing, the shutter is released, and the timer circuit 3 is controlled by the microprocessor 5 according to the preliminarily set exposure time for effecting the time counting function, and thus, the shutter closing function is completed. The control register 31 receives the data from the microprocessor 5 through the data bus 50 to control the timer circuit 3, while the switch 75 is closed upon starting of the shutter opening function and emits the starting signal for the timer function.

Hereinbelow, the functionings of the arrangement of FIG. 4 will be described more in detail.

Firstly, when the shutter release button is depressed to its first stage by the photographer, all circuits are reset for starting functionings. Subsequently, data is first set in the A-D conversion control register 11 through the microprocessor 5. Since the data to be set is that data corresponding to A-D conversion aiming at reception of photographic data, four analog signals are successively subjected to the A-D conversion by the signal from the line 18. When these four analog signals, which include the $Bv - Avo$ signal from the light measuring circuit 12 and the Tv, Sv and Avo signals, are subjected to A-D conversion and respectively stored in the predetermined registers in the block 1; the A-D conversion completion signal is then applied to the microprocessor 5 through the line 17. In the next step, the microprocessor 5 carries out calculations to solve the equation $(Bv - Avo) + Avo + Sv - Tv = Av$ on the basis of the photographic data stored in the register within the A-D conversion unit 1 as described with reference to FIG. 1, while the value Av thus calculated and set value Tv are set in the register in the display circuit 2, and according to the signal from the control register 21, the diaphragm aperture value or f number and exposure time are dynamically displayed at the segment by the display device 22.

Thereafter, the microprocessor 5 judges whether the shutter release signal is applied from the switch 72 or not, and if not, the functions of A-D conversion, operations and display are effected again. When the shutter release signal is being applied, presence of the signal from the switch 73 which is closed upon shutter cocking and opened upon closing of the shutter is detected, and if said signal is not being applied as input, it means that the photographic preparation is not ready, and the microprocessor 5 again goes back to the A-D conversion function. Therefore, when the shutter release button has been depressed down to the first stage, with the shutter cocked and also when the shutter release button has been depressed to the first or second stage, with the shutter not cocked, the functions for the A-D conversion, calculations and display are repeated, while the above functions are stopped when the shutter release button is released. During the A-D conversion of the signal from the light measuring circuit 12, the display is extinguished by the signal from the line 19 as mentioned earlier with reference to FIG. 1.

When the shutter release signal is being applied as an input, with the shutter cocked, the display extinguishing signal is subsequently transferred to the display control register 21, and the display goes out. Before the release signal is applied to the release circuit 61, the output of the light measuring circuit 12 is again subjected to A-D conversion. The above function is necessary, because in the arrangement of FIG. 4, it is so arranged for the control of diaphragm aperture, that the estimated value $Bv - Av$ of incident light amount at the diaphragm aperture value Av is preliminarily set for comparison with the light measuring output during actual stopping down of the diaphragm aperture so that the stopping down is suspended by the signal from the aperture control circuit 62 when the both values are equal. More specifically, for example, in the case where a photograph is taken by altering the "framing" after storing the brightness of the main subject to be photographed as in the so-called "AE lock" photographic mode, since the amount of brightness Bv corresponding to the brightness of the main object to be photographed employed for the calculation of correct exposure differs from the amount of brightness Bv' corresponding to the brightness of the object at the starting of stopping down for stopping the diaphragm aperture after the alteration of the "framing", it is required that, for controlling the diaphragm aperture with respect to the value Av, the value Bv' is preliminarily obtained for comparison of the value Bv'-Av with the light measuring output during the actual stopping down. Therefore, before the shutter releasing, the output of the light measuring circuit 12 is subjected to A-D conversion. In the above case, since other photographic data is not necessary, corresponding control data is set in the A-D control register. When the value Bv'-Avo has been subjected to A-D conversion and stored in the register in the block 1, the A-D conversion completion signal is applied to the microprocessor 5 through the line 17. In the microprocessor 5, calculation for the value of $(Bv' - Avo) + Avo - Av$ is effected between the values of $Bv' - Avo$, and Av and Avo calculated and displayed in the manner as described earlier, and the comparative data $Bv' - Av$ for the diaphragm aperture control is obtained.

Subsequently, the release signal is applied to the release circuit 61, while simultaneously, data showing that the block 1 is caused to function as the D-A converter is set in the A-D conrtol register, and the value corresponding to $Bv' - Av$ calculated as mentioned earlier is applied from the microprocessor 5 to the block 1 through the data bus 50. In the above case, for the actual practice, the value obtained by adding the constant α to the value Bv'−Av is set as the D-A conversion data so that the coincidence signal is emitted at the open side with respect to the planned diaphragm aperture value so as to prevent the diaphragm aperture from being excessively stopped down due to delay in functioning of the diaphragm aperture mechanical portion and magnet in the aperture control circuit 62.

In the next step, the time period 32 m sec. required for the diaphragm aperture to be stopped down to the minimum aperture is set in the timer circuit 3 by setting the data equivalent to 32 m sec. in the timer control register 31, and the counting is started by the signal from the timer counting starting signal line 33.

The comparator signal through the line 16 is arranged to be developed only when the A-D control register 11 is set for D-A conversion, and is emitted upon coincidence of the D-A output and output of the light measuring circuit so as to suspend the stopping down function. In the above state, if the brightness of the object to be photographed or scene brightness suddenly changes, there may be cases where the comparator signal through the line 16 is not emitted even when the diaphragm aperture reaches the minimum value or preset value by the stopping down function of the diaphragm aperture. In such cases, the count completion signal from the timer circuit 3 is applied to the microprocessor 5 through the line 34, and then, the aperture control circuit 62 is caused to function by the signal from the microprocessor 5.

In the next step, data for the time period 8 m sec. from the suspension of the stopping down to stabilization of the diaphragm aperture is set in the counter circuit 3 for counting. Upon termination of the counting, the A-D control register 11 is again set to effect the A-D conversion of the signal from the light measuring circuit 12. In the above case, the light measuring output is represented by Bv'−Av, and the value Tv is calculated by the addition of the difference Bv−Bv' between the scene brightness during the "AE lock" photographic mode mentioned earlier and the scene brightness before the stopping down of the diaphragm aperture and also the value Sv to the value Bv'−Av. With the value Tv thus calculated and set in the timer circuit 3, mechanical operations such as mirror lock-up, etc. are effected to wait for the starting of the shutter opening function.

Upon starting of the shutter opening function, the switch 75 is closed for initiating the counting of time obtained by logarithmic expansion of the value Tv, and when the counting is terminated, the count completion signal is produced in the line 35 so as to start the closing function by the shutter closing function control circuit 63.

When the closing function has been completed, the completion signal is applied to the microprocessor 5 from the block 73, and data from the time period 32 m sec. required for the mechanical parts (mirror, diaphragm, etc.) to return to the original state is set in the timer circuit 3 for starting the counting. Upon termination of the counting, the A-D conversion, calculations and display are repeated from the start so far as the signal from the light measuring display starting signal circuit is present.

Figure 5:
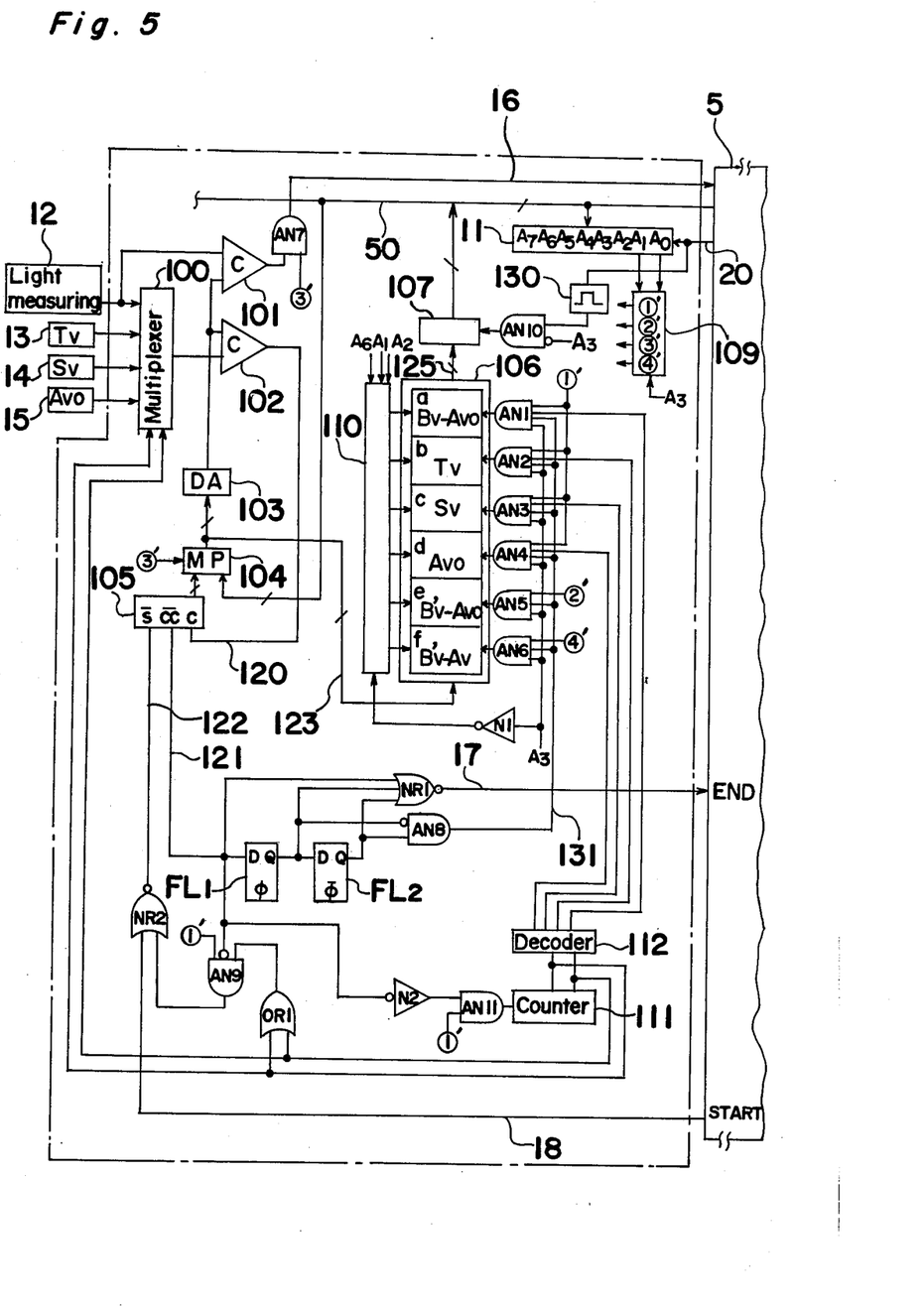
FIG. 5 is an electrical circuit diagram showing the construction of a conversion circuit employed in the arrangement of FIG. 4.

Referring to FIG. 5 showing one example of specific circuit construction of the arrangement of FIG. 4, the analog outputs of the circuits 12, 13, 14 and 15 are changed over by a multiplexer 100 so as to be applied to one terminal of a comparator 102, which constitutes a successive approximation A-D converter together with a D-A converter 103, and a successive approximation register 105 (for example, Am 2 5L02 manufactured by Advanced Micro Devices Inc. of U.S.A.) coupled thereto. Another multiplexer 104, coupled to the other terminal of the comparator 102 through a D-A converter 103 and also coupled to the register 105 and data bus 50, is arranged to change over the input so that during A-D conversion function, the content of the register 105 is applied to the D-A converter 103, while during D-A conversion function, the content of the data bus 50 is applied to the D-A converter. A group 106 of registers a, b, c, d, e and f, coupled to the multiplexer 104 through a line 123 and also coupled to the data bus 50 through a gate 107 via a line 125, store therein the data subjected to the A-D conversion. The data to be stored in the registers a to f are those data related to various data input during the receipt of the photographic data, and include the value Bv−Avo for the register a, the value Tv for the register b, the value Sv for the register c and the value Avo for the register d. Meanwhile, in the register e, the data corresponding to the light measuring data Bv'−Avo before the stopping down of the diaphragm aperture is stored, and in the register f, the data corresponding to the light measuring data Bv'−Av after the stopping down is stored. The data, as described above, is applied through the line 123 and subjected to write-in control at AND gates AN1, AN2, AN3, AN4, AN5 and AN6, and the read-out of the stored data is effected in such a manner that the data of the registers selected by a read-out control gate 110 is output to the line 125 so as to be applied to the microprocessor 5 through the data bus 50 via the gate 107. In the A-D control register 11, the data from the microprocessor 5 is written by the register set signal from the line 20. Respective bits correspond to each other as follows.

When the bit A3 indicating the converting function corresponds to A3=1, then A-D or D-A conversion is effected according to the contents of A1, A0 as shown in Table 3 below. The contents of A1, A0 are decoded by a decoder 109 and signals (1)', (2)', (3)' and (4)' corresponding to modes (1), (2), (3) and (4) of Table 3 are emitted as outputs.

TABLE 3

| A3 | A1 | A0 | Mode |
|---|---|---|---|
| 1 | 0 | 0 | (1) During data in-take period, the data of the circuits 12 to 15 are subjected to A-D conversion for storing in the registers a to f. |
| 1 | 0 | 1 | (2) Before stopping down of the diaphragm aperture, the data of the circuit 12 are subjected to A-D conversion for storing in the register e. |
| 1 | 1 | 0 | (3) D-A conversion for aperture control |
| 1 | 1 | 1 | (4) The data of the circuit 12 after stopping down is subjected to A-D conversion for storing in the register f. |

When A3=0, the stored contents of the registers a to f in the register group 106 are read out to correspond to A2, A1, and A0 as shown in Table 4 below.

TABLE 4

| A3 | A2 | A1 | A0 | Register symbol |
|---|---|---|---|---|
| 0 | 0 | 0 | 0 | a |
| 0 | 0 | 0 | 1 | b |
| 0 | 0 | 1 | 0 | c |

TABLE 4-continued

| A3 | A2 | A1 | A0 | Register symbol |
|----|----|----|----|-----------------|
| 0  | 0  | 1  | 1  | d               |
| 0  | 1  | 0  | 0  | e               |
| 0  | 1  | 0  | 1  | f               |

The read-out is effected in such a manner that, when the data corresponding to the necessary register of the registers a to f is set in the A-D control register 11 by the register setting signal through the line 20, the register setting signal mentioned above opens the gate 107 for a predetermined period of time through the one shot circuit 130, and the data being applied as output to the data bus 50. It is to be noted that in the above embodiment, the bits for A7 to A4 are not used.

The circuit block constituted by flip-flops FL1, FL2, and an AND gate AN8 and a NOR gate NR1 is intended to produce an END signal for A-D conversion completion through a line 17, and a write-in timing signal in a line 131 for writing the data subjected to A-D conversion in the corresponding one of the registers a to f. Meanwhile, the circuit block including an inverter N2, and AND gate AN11, a counter 111, and a decoder 112 is for successively writing the A-D conversion data of the inputs for the circuits 12 and 13 during in-take of the data of the mode (1), into the registers a to d, and is so arranged that the output of the counter 111 is fed to the multiplexer 100, by which the inputs for the circuits 12 to 15 are changed over, while the corresponding registers a to f are selected by the output of the decoder 112.

A NOR gate NR2, coupled to the register 105 through a line 122, is adapted to apply the start signal for the A-D conversion to the S̄ terminal of the successive approximation register 105, and is connected at its one input terminal, to the start output of the microprocessor 5 which controls the A-d conversion start, and at the other input terminal thereof, to the output terminal of an AND gate AN9, which generates start signals for b, c and d of the four A-D conversions with reference to the data corresponding to the registers a to d during in-take of the data for the mode (1).

Subsequently, the functionings of the circuit of FIG. 5 will be described according to the functions described with reference to FIG. 4. Upon depression of the shutter release button to the first stage by the photographer, all the circuits are reset for starting operations. Firstly, the data is set in the A-D conversion control register 11 from the microprocessor 5. The content of the above data is "00001000" which indicates in-take of the data of the mode (1) shown in Table 3. In the foregoing embodiment, the bits for A7 to A4 and A2 which are not specified in Table 1 are a logic "0". Upon the setting of such data, in the decoder 109, an "output enable" is achieved when A3=1, and when A1, A0=(00), a "1" is generated at the terminal (1)', and a "0" is generated at the terminals (2)', (3)' and (4)'. On the other hand, since the output of the counter 111 remains a "00", the output of the light measuring circuit 12 is selected by the multiplexer 100, and the multiplexer 104 output being a 0 at (3)', and therefore, the output of the successive approximation register 105 is selected.

In the above state, when the start pulse, which becomes "high" for one clock period, is generated by the microprocessor 5, the signal is applied to the S̄ terminal of the successive approximation register 105 from the line 122 through the NOR gate NR2, and by the comparator 102, successive approximation register 105 which receives the comparator output at its C terminal through a line 120 and D-A converter 103, the A-D conversion of the output of the light measuring circuit 12 is started by the known successive approximation type A-D conversion. Upon termination of the above function, a conversion completion signal is developed from the C̄C̄ (conversion complete) terminal of the successive approximation register 105. By the above signal, the content of the counter 111 is altered from 00 to 01, and simultaneously, write-in pulses are generated by the flip-flops FL1 and FL2, and AND gate AN8; the AND gate AN1, corresponding to the content 01 of the counter 111, is selected by the decoder 112 for conduction during the timing of the write-in pulses, and the A-D conversion data of the output of the light measuring circuit is written in the register a through the line 123.

Figure 6:
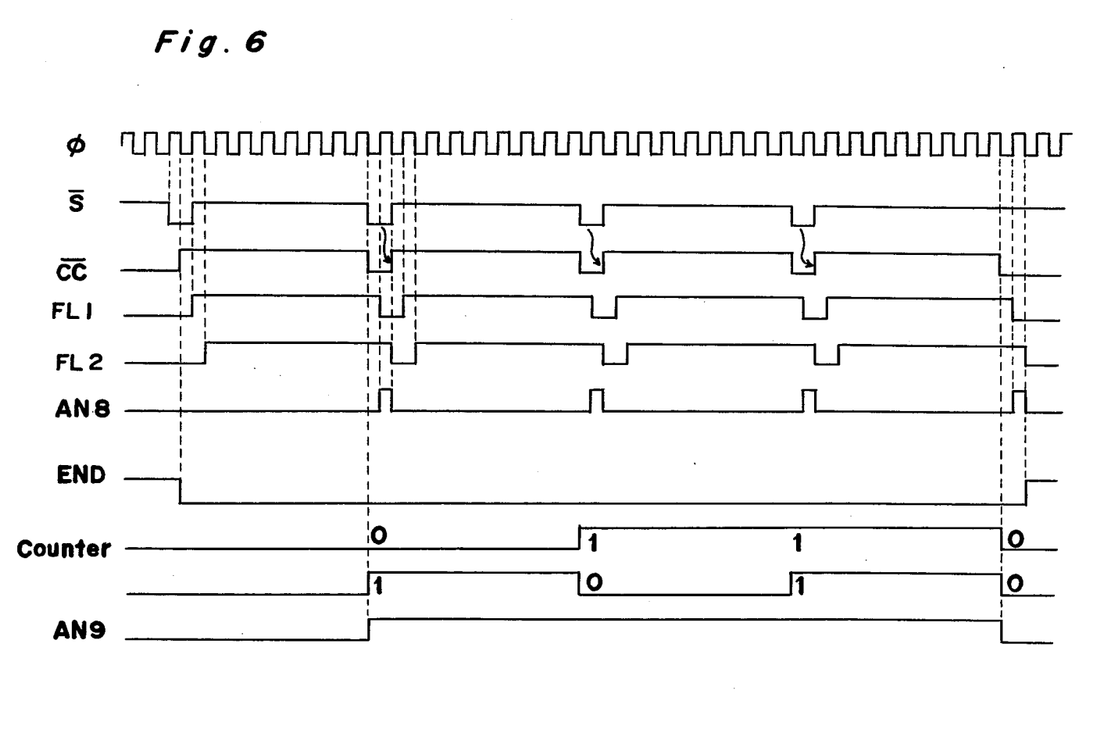
FIG. 6 is a timing chart explanatory of functions of part of the circuit of FIG. 4.

Referring also to a timing chart of FIG. 6 for the A-D conversion unit of the arrangement in FIG. 4, functions thereof will be described in detail hereinbelow.

In the first place, when the start signal, which becomes "high" only during one clock, is emitted from the microprocessor 5 through the line 18, the output of the NOR gate NR2 will become "low". The S̄ terminal of the successive approximation register 105 then becomes "low", and upon falling the trailing edge of the subsequent clock, the output at the C̄C̄ terminal becomes "high" to start the A-D conversion at the leading edges of the next clocks, and after 7.5 clock, the A-D conversion based on the 8 bit successive approximation system is completed. Then, the C̄C̄ terminal of the successive approximation register 105 becomes "low". This signal first turns the counter 111 from "00" to "01" and also renders the S̄ terminal of the register 105 to be "low" through an OR gate OR1, the AND gate AN9 and NOR gate NR2, whereby the output from the C̄C̄ terminal becomes "high" during the trailing edge of the subsequent clock, and the A-D conversion is started at the next clock. Furthermore, when the output from the C̄C̄ terminal becomes "low", the output Q of the flip-flop FL1 becomes "low" at the leading edge of the subsequent clock, and further, the output Q of the flip-flop FL2 becomes "low" at the trailing edge of the subsequent clock. Accordingly, the output of the AND gate AN8 becomes "high" during the leading edge of the subsequent clock at which time the C̄C̄ terminal becomes "low" so as to become "low" after a half clock time. In the above case, the output of the counter 111 is "01", while the output of the decoder 112 selects the AND gate AN1, and thus, at the leading edge of the AND gate AN8, the A-D conversion value of the light measuring circuit 12 is set in the register a.

Subsequently, in the similar manner as described above, digital values corresponding to the values Tv, Sv and Avo are sequentially set in the registers b, c and d. Upon completion of the A-D conversion corresponding to the value Avo, the counter 111 changes from "11" to "00" without emission of a "high" signal from the AND gate AN9, and therefore, only the "high" signal is generated by the NOR gate NR2, without a fresh A-D conversion. Thus, the terminal CC remains "low" and at the time when the Q outputs of the flip-flops FL1 and FL2 both become "low", a "high" signal is emitted from the NOR gate NR1, so that the A-D conversion of the mode (1) is completed.

Hereinbelow, the relationship between the output of the counter 111, analog input selected by the multiplexer 100 and register selection AND gate selected by the decoder 112 is shown in Table 5 below.

TABLE 5

| Counter 111 output | Multiplexer 100 | | Decoder 112 output |
|---|---|---|---|
| 00 | Light measuring circuit | 12 | AN4 |
| 01 | Tv | 13 | AN1 |
| 10 | Sv | 14 | AN2 |
| 11 | Avo | 15 | AN3 |

In the next step, upon completion of the A-D conversion of the mode (1), it is necessary to input this data into the microprocessor 5 which carries out calculation by the use of such data as described earlier. For the above purpose, the data is again set in the A-D control register 11. For inputting the content of the register a into the microprocessor 5, when A3, A2, A1 and A0="0000" (as shown in Table 4) is set in the A-D control register 11, the content of the register a is selected by the read-out control gate 110 in which the register selecting bits A2, A1 and A0 and read-out signal bit $\overline{A3}$ are input for applying to the gate 107 through the line 125. Meanwhile, the set signal applied through the line 20 for setting the A-D control register 11 is also fed to the one shot circuit 130, and since an AND gate AN10, inserted between the circuit 130 and gate 107, is conductive for a predetermined period of time after application of the set signal to open the gate 107, the content of the required register a is placed on the data bus 50 so as to be transferred to the microprocessor 5. Similarly, the other data are is also successively set in the register 11 according to Table 4, and thus, the contents of the registers b to d are accessed by the microprocessor 5 which performs the calculation as described earlier, with subsequent display by the display unit. The functions as described above are then repeated.

Upon subsequent input of the release signal, owing to the function of the mode (2) for subjecting the output of the light measuring circuit 12 to an A-D conversion before the stopping down of the diaphragm aperture, the values A3, A2, A1, A0=1001 are set in the A-D control register 11. In the above state, when the start signal is generated by the microprocessor 5, the output of the light measuring circuit is subjected to an A-D conversion in the similar manner as in the mode (1), and the data in this case is written in the register e by the AND gate AN5. The AND gate AN9 becomes nonconductive since (1)' is "0", and only the output of the light measuring circuit 12 is subjected to an A-D conversion for subsequent output of the END signal.

In the microprocessor 5, in a similar manner to that described previously, the values A3, A2, A1, A0="0100" are set in the register 11 for read-out so as to calculate the value of Bv'−Av+α for the diaphragm aperture control, and after the data A3, A2, A1, A0=1010 for the mode (3) (D-A conversion) have been set in the A-D control register 11, data corresponding to the value Bv'−Av+α is applied from the data bus to the multiplexer 104. In the above case, since the multiplexer 104 has been switched over to the side of the data bus by the output (3)', the D-A conversion value of the value Bv'−Av+α and the output of the light measuring circuit are compared in the comparator 101. Upon stopping down of the diaphragm aperture, when the output of the light measuring circuit 12 coincides with the value Bv'−Av+α, the comparator output is applied to the microprocessor 5 and diaphragm aperture control circuit 62 through an AND gate AN7, inserted between the output of the comparator 101 and microprocessor 5. In the above case, the D-A conversion output has the value Bv'−Av+α as described with reference to FIG. 4 for compensating the time delay in the diaphragm aperture control. The method for compensating the time delay in the aperture control as described above may be modified in such a manner that, with the D-A conversion output arranged to be of the value Bv'−Av, offset, or counterbalance value is provided between the outputs of the comparator 101 so that the comparator output is inverted when the light measuring output is larger than the D-A conversion output by a predetermined value. Furthermore, the method for the time delay compensation in the aperture control may be so modified that, since the speed of the diaphragm aperture stopping down differs in dependence upon the diaphragm aperture values, the value of α is altered according to the planned diaphragm aperture value.

Upon the determination of the diaphragm aperture in the foregoing function, the mode (4) is subsequently entered, and the output of the light measuring circuit 12 in the stopped down state of the diaphragm aperture is again subjected to A-D conversion for obtaining a fresh Tv value. The data A3, A2, A1, A0=1011 is set in the A-D control register 11, and the multiplexer 104 being again switched over to the side of the successive approximation register 105, and after only one A-D conversion in the similar manner as in the mode (2), the data is written in the register f. This data is read out by the microprocessor 5 for calculation of the exposure time.

By the foregoing functions, when the data is written in the registers e and f during the mode (2) and mode (4), the contents of the registers a to d in which the data is written in the mode (1), have already been input to the microprocessor 5, and therefore, the registers e and f may be used commonly with the registers a to d, in which case, the construction of the block 1 is simplified.

After the above functionings, the exposure control is effected as described with reference to FIG. 4, and one cycle for photography is completed.

In the foregoing embodiment, although the description is related to the light measuring output, set Tv value, film sensitivity value and open diaphragm aperture value as the data to be subjected to the A-D conversion, it is to be noted that the present invention is applicable to the data other than the exposure parameters as described in the foregoing, for example, to the setting of an interval time in the case where the shutter release function is to be effected at predetermined time intervals through the combination with an automatic film winding unit.

As is clear from the foregoing description, according to the present invention, it has become possible to commonly use the control circuit with other circuits (for example, control circuits for mechanism portions such as the diaphragm aperture or shutter mechanism, counter circuit, display circuit) by the employment of the microprocessor 5 for the control of the conversion circuit, with consequent reduction of the number of elements required, and thus, not only is the entire exposure control circuit readily constituted in the form of a one chip LSI element, but the manufacturing cost is further reduced if a microprocessor for general purpose use is employed as the microprocessor 5.

Furthermore, according to the present invention, the A-D conversion may be selectively effected, for example, for a plurality of portions during the data input or only for the required portion in the form of A-D conversion of single data inputs in other cases. Therefore, there is no waste in the time required for the conversion, and moreover, for the control of selection, setting of the data corresponding to the conversion and controlling register is only required, and thus, the specific weight of the software of the microprocessor is reduced, with consequent reduction of the ROM capacity for the instructions.

Although the present invention has been fully described by way of example with reference to the attached drawings, it is to be noted that various changes and modifications are apparent to those skilled in the art. Therefore, unless such changes and modification otherwise depart from the scope of the present invention, they should be construed as included therein.

What is claimed is:

1. Digital exposure control arrangement for cameras comprising:
   means for measuring light intensity and for generating an analog light measuring signal;
   an A-D converter, operatively connected to said light intensity measuring means, for converting said analog light measuring signal into a digital light measuring signal;
   means for setting exposure information and for producing exposure information signals;
   a microprocessor for controlling camera operation, said microprocessor processing said digital light measuring signal and said exposure information signals to generate a diaphragm aperture control signal;
   a diaphragm aperture capable of changing its aperture size;
   means for generating a changing signal which changes in accordance with the changes in the aperture size of said diaphragm aperture;
   means for comparing said changing signal with said diaphragm aperture control signal to generate a detecting signal when said changing signal has a predetermined relationship with said diaphragm aperture control signal, said comparing means being connected to said microprocessor for transmitting said detecting signal thereto, wherein said microprocessor advances into a next step of camera control upon receipt of said detecting signal; and
   means directly connected with said comparing means for interrupting said change in aperture size of said diaphragm aperture upon receiving said detecting signal from said comparing means.

2. Digital exposure control arrangement as claimed in claim 1, wherein said setting means is adapted to produce said exposure information signals in analog form, and wherein said A-D converter is operatively connected to said setting means for converting said exposure information signals into a digital form, said microprocessor controlling said A-D converter to convert said analog light measuring signal and said exposure information signals into respective digital signals in a predetermined sequence.

3. Digital exposure control arrangement as claimed in claim 2, wherein said A-D converter performs a D-A conversion operation under the control of said microprocessor for converting said diaphragm aperture control signal generated by said microprocessor in a digital form into an analog form, said generating means generating said changing signal in an analog form, and said comparing means being of an analog type.

4. Digital exposure control arrangement for cameras comprising:
   means for measuring light intensity and for generating an analog light measuring signal;
   an A-D converter, operatively connected to said light intensity measuring means, for converting said analog light measuring signal into a digital light measuring signal;
   means for setting at least one exposure information and for producing at least one exposure information signal;
   a microprocessor for controlling camera operations, said microprocessor processing said digital light measuring signal and said at least one exposure information signal to generate an exposure time control signal;
   means operatively connected to said microprocessor for informing said microprocessor of the termination of camera operations preceding the exposure time control;
   means operatively connected to said microprocessor for counting exposure time in accordance with said exposure time control signal, said counting means informing said microprocessor of the end of the exposure time counting;
   means for initiating the exposure in a predetermined relationship with the beginning of said exposure time counting; and
   means operatively connected to said counting means for terminating the exposure in response to the end of said exposure time counting.

5. Digital exposure control arrangement as claimed in claim 4, wherein said initiating means includes means for actuating said counting means to begin said exposure time counting in response to the initiation of the exposure.

6. Digital exposure control arrangement for camera comprising:
   microprocessor for controlling camera operations;
   means for informing said microprocessor of the termination of a camera operation preceding the automatic exposure control;
   means for controlling the exposure in response to a light measurement and informing said microprocessor of the end of its operation;
   means directly connected to said exposure control means for automatically determining the exposure; and
   means operatively connected to said microprocessor for performing a camera operation subsequent to the automatic exposure control.

7. Digital exposure control arrangement as claimed in claim 6, further comprising a diaphragm aperture capable of changing its aperture size, wherein said exposure controlling means includes means for initiating a change in the aperture size and means for comparing a first signal determined prior to the initiation of the change in the aperture size with a second signal which changes in accordance with the change in the aperture size to generate a detecting signal when said second signal has a predetermined relationship with said first signal, and wherein said exposure determining means includes means directly connected with said comparing means for interrupting said change in aperture size upon receiving said detecting signal from said comparing means.

8. Digital exposure control arrangement as claimed in claim 6, wherein said exposure controlling means includes means operable within the exposure time for generating a timing signal when the amount of the exposure reaches a predetermined level, and wherein said exposure determining means includes means directly connected with said generating means for determining the timing of the termination of the substantial exposure upon receiving said timing signal from said generating means.

* * * * *